(12) United States Patent
Lakshmanan et al.

(10) Patent No.: US 7,962,650 B2
(45) Date of Patent: Jun. 14, 2011

(54) DYNAMIC COMPONENT PLACEMENT IN AN EVENT-DRIVEN COMPONENT-ORIENTED NETWORK DATA PROCESSING SYSTEM

(75) Inventors: Geetika Tewari Lakshmanan, Cambridge, MA (US); Chitra Dorai, Chappaqua, NY (US); Robert Evan Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 12/100,915

(22) Filed: Apr. 10, 2008

(65) Prior Publication Data

US 2009/0259769 A1    Oct. 15, 2009

(51) Int. Cl.
*G06F 15/173* (2006.01)
(52) U.S. Cl. .................. 709/241; 719/318
(58) Field of Classification Search .......... 709/241; 719/318
See application file for complete search history.

(56) References Cited

U.S. PATENT DOCUMENTS

| | | | |
|---|---|---|---|
| 5,166,927 A | 11/1992 | Iida et al. | |
| 6,185,598 B1 * | 2/2001 | Farber et al. ................ | 709/200 |
| 6,260,072 B1 * | 7/2001 | Rodriguez-Moral ........ | 709/241 |
| 6,829,771 B1 * | 12/2004 | Bahrs et al. ................. | 719/318 |
| 7,010,525 B2 | 3/2006 | Botzer et al. | |
| 7,080,146 B2 | 7/2006 | Bradford et al. | |
| 7,840,704 B2 * | 11/2010 | Balonado et al. ............ | 709/241 |
| 2003/0235168 A1 | 12/2003 | Sharma et al. | |
| 2004/0103218 A1 | 5/2004 | Blumrich et al. | |
| 2006/0200251 A1 | 9/2006 | Gu et al. | |
| 2007/0047453 A1 | 3/2007 | Bender et al. | |
| 2007/0083662 A1 | 4/2007 | Adams et al. | |
| 2007/0160039 A1 | 7/2007 | Xu | |
| 2007/0223377 A1 | 9/2007 | de Heer | |
| 2007/0233843 A1 | 10/2007 | Frey-Ganzel et al. | |
| 2008/0301175 A1 * | 12/2008 | Applebaum et al. .......... | 707/102 |
| 2009/0024622 A1 * | 1/2009 | Chkodrov et al. ............ | 707/6 |

OTHER PUBLICATIONS

Jueneman et al., "Explicit Path Routing for Seitching Network", IBM Technical Disclosure Bulletin, vol. 18, No. 9, Feb. 1976, pp. 3059-3062.
Lynch et al., "Channel-to-Channel Adaption", IBM Technical Disclosure Bulletin, vol. 23, No. 2, Jul. 1980, pp. 710-711.
"Network Feasibility Algorithm and Class of Service Generation in Advanced Peer-to-Peer Networks", IBM Technical Disclosure Bulletin, vol. 34, No. 3, Aug. 1991, pp. 38-41.

(Continued)

*Primary Examiner* — Dohm Chankong
*Assistant Examiner* — Thomas J Dailey
(74) *Attorney, Agent, or Firm* — Yee & Associates, P.C.; William Stock

(57) ABSTRACT

Method, system and computer usable program code for dynamic component placement in an event processing system having producers, consumers, a plurality of nodes between the producers and the consumers, and a flow graph representing computational components to be executed between the producers and the consumers. A description of a change to the system is received. At each node, next-hop neighbor nodes for each consumer are identified. A routing value is assigned to each next-hop neighbor node for each consumer. Using the routing values in a context of the change, a performance cost of the system is estimated based on hypothetical changed placements of the computational components at nodes along paths from a producer to a consumer through the next-hop neighbor nodes for each consumer, and a changed placement of the computational components that minimizes performance cost of the system relative to the hypothetical changed placements is selected.

17 Claims, 9 Drawing Sheets

OTHER PUBLICATIONS

"Load Balancing for Variable Sized Connections with Dynamically changing Bandwidth Requirements", IBM Technical Disclosure Bulletin, vol. 35, No. 5, Oct. 1992, pp. 435-438.

"Algorithm for Assigning Weights to Links of APPN Networks", IBM Technical Disclosure Bulletin, vol. 36, No. 11, Nov. 1993, pp. 171-172.

Pandit et al., "Performance Modeling and Placement of Transforms for Stateful Mediations", IBM Technical Report, Nov. 2004, pp. 1-21.

Shah et al., "Flux: An Adaptive Partitioning Operator for Continuous Query Systems", In ICDE, Oct. 2002, pp. 1-15.

Xing et al., "Dynamic Load Distribution in the Borealis Stream Processor", In ICDE, 2005, pp. 1-12.

Ahmad et al., "Network-Aware Query Processing for Stream-Based Applications", In VLDB, 2004, pp. 1-12.

Pietzuch et al., "Network-Aware Operator Placement for Stream-Processing Systems", In ICDE, 2006, pp. 1-12.

Srivastava et al., "Operator Placement for In-Network Stream Query Processing", In PODS, 2005, pp. 1-9.

Marques et al., "Ant Colony Optimization for Job Shop Scheduling", Proceedings of the Third Workshop on Genetic Algorithms and Artificial Life (GAAL 99), 1999, pp. 1-8.

Colorni et al., "The Ant System Applied to the Quadratic Assignment Problem", IEEE Transactions on Knowledge and Data Engineering 11 (5), 1998, pp. 1-18.

Corcoran et al., "A Genetic Algorithm for File and Task Placement in a Distributed System", Evolutionary Computation, IEEE World Congress on Computational Intelligence, Proceedings of the First IEEE Conference on Volume, Jun. 1994, pp. 1-5, vol. 1, Issue 27-29.

Ooi et al., "Efficient Dynamic Operator Placement in a Locally Distributed Continuous Query System", Proceedings of the 14th International Conference on Cooperative Information Systems, Nov. 2006, pp. 1-18, LNCS 4275, Springer-Verlag, Montpellier, France.

Cooper et al., "Distributed Stream Management using Utility-Driven Self-Adaptive Middleware", In Proceedings of the Second International Conference on Automatic Computing, IEEE Computer Society, Jun. 2005, pp. 1-12, Washington, D.C., United States.

Gu et al., "Synergy: Sharing-Aware Component Composition for Distributed Stream Processing Systems", ACM/IFIP/USENIX International Middleware Conference, Nov. 2006, pp. 1-20, Melbourne, Australia.

Gu et al., "Optimal Component Composition for Scalable Stream Processing", IEEE International Conference on Distributed Computing Systems, 2005, pp. 1-10, Columbus, OH, United States.

Caro et al., "AntNet: Distributed Stigmergetic Control for Communications Networks", Journal of Artificial Inteligence Research 9, 1998, pp. 1-49.

Amini et al., "Adaptive Control of Extreme-Scale Stream Processing Systems", In Proceedings of ICDCS, 2006, pp. 1-7, Yorktown Heights, NY, United States.

* cited by examiner

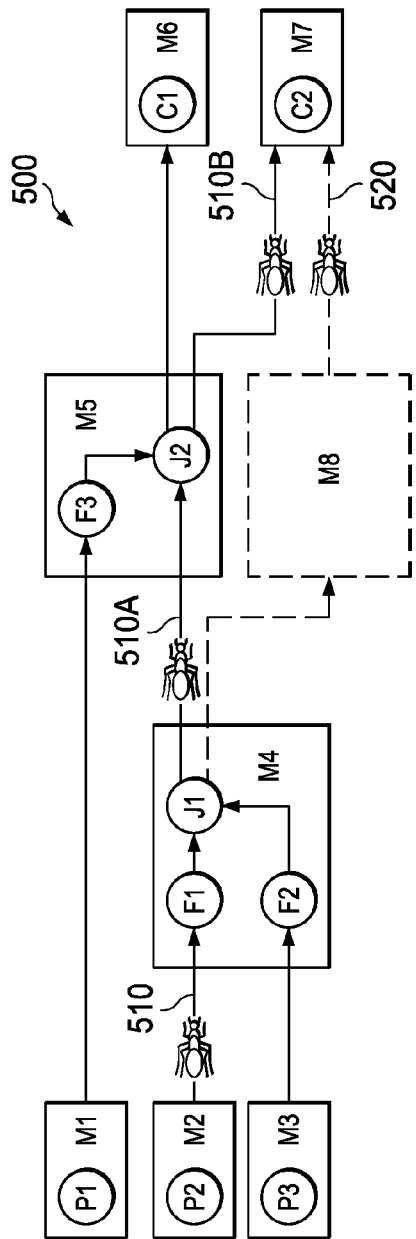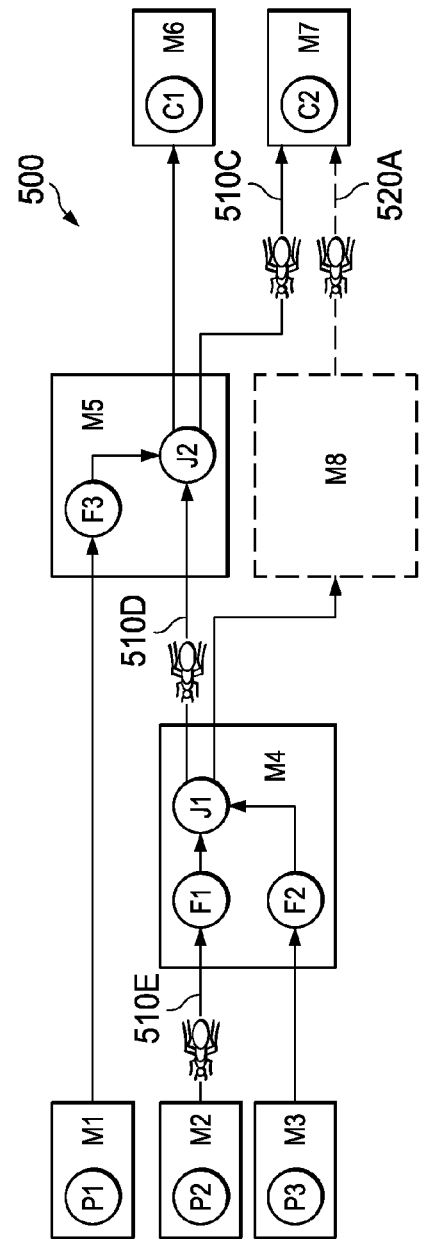

- ESTIMATE $k_i$
- FORMULATE AS A NON-LINEAR PROGRAM AND SOLVE USING NON-LINEAR OPTIMIZATION TECHNIQUES $$r = \frac{\frac{k_1}{T_{i \to d}} + k_2 o_{i-1}^r + \frac{k_3}{l_{i-1}}}{\frac{1}{T_{i \to d}} + o_{i-1}^r + \frac{1}{l_{i-1}}}, r \in [0,1]$$

- ROUTING VALUE $r$ FOR PATH FROM NODE M1 TO NODE C1 VIA NODE M2 IS REINFORCED BY:

$$r^{M1}_{M2,C1}(t+1) = r^{M1}_{M2,C1}(t)(1-r) + r$$

- AND ROUTING VALUE FOR PATHS FROM NODE M1 TO NODE C1 VIA ANY OTHER NODE $n$ IS DECREASED $$r^{M1}_{n,C1}(t+1) = r^{M1}_{n,C1}(t) - r^{M1}_{n,C1}(t).r, n \neq i-1$$

DYNAMIC COMPONENT PLACEMENT IN AN EVENT-DRIVEN COMPONENT-ORIENTED NETWORK DATA PROCESSING SYSTEM

BACKGROUND OF THE INVENTION

1. Field of the Invention

The present invention relates generally to the data processing field and, more particularly, to a decentralized computer implemented method, system and computer usable program code for dynamically optimizing component placement in an event-driven component-oriented network data processing system that is subject to changes in function, infrastructure and/or performance.

2. Description of the Related Art

Component placement is an important factor in optimizing performance in an event-driven component-oriented network data processing system. Optimal component placement may be defined as placing components (for instance database query operators) in a flow onto an available set of machines in a network such that the placement minimizes the end-to-end latency for each path from producers to consumers of events.

Prior efforts that address the problem of component placement include the use of static centralized placement algorithms that are not responsive to changes that may occur in an event-driven component-oriented network data processing system. Such changes may include, for example:
1. Changes in Function:
   a. Producers or consumers may be added or deleted.
   b. Components may be added, deleted or modified.
2. Changes in performance characteristics:
   a. Message rates from producers may change.
   b. Data may change causing workload on different components to change.
3. Changes in Infrastructure:
   a. Server capacities may change or servers may go on or off line.
   b. Links between servers may become congested or unavailable.

Known approaches to static distributed component placement include "biological" approaches in which component placement is described in terms of activities performed by a colony of ants. In one known biological approach, ants visit nodes in a network data processing system and assign a task to each node such that the product of the flows between activities is minimized by the distance between their locations. Since the tasks are static and the flow between activities is not governed by a stream where the data rate can vary, the scope of these algorithms does not extend to changes in the network data processing system such as described above.

Another class of task placement problems for which ant colony optimization algorithms have been proposed is referred to as the "Job-Shop Scheduling" problem. In the Job-Shop Scheduling problem, a set of machines and a set of jobs are given. Each job consists of an ordered sequence of operations. The problem is to assign the operations to time intervals in such a way that the maximum of the completion times of all operations is minimized and no two jobs are processed at the same time on the same machine. In this problem, the jobs are independent tasks that need to be completed and there is no event flow between the tasks.

A genetic algorithm has also been proposed for static file and task placement in a distributed system. The problem addressed is to find the optimal placement of files and tasks at sites with the objective of minimizing the total cost of transmitting files between sites and of ensuring that the aggregate capacity of any site is not exceeded, given the requirements of each site. This method cannot easily be extended to address optimal component placement when there are dynamic changes in the network infrastructure, performance or the types of files and tasks that need to be placed.

To date, algorithms inspired by biology for task placement have not been extended to work effectively in a stream-based environment where there is a flow of events between tasks.

A centralized approach to component placement algorithms has also been proposed. In particular, if conditions change in an event-driven component-oriented network data processing system, a centralized controller is responsible for re-computing an optimal component placement and updating the network. In some approaches, a dynamic load balanced strategy is developed in the context of continuous queries. The centralized controller is employed to collect workload information and make load balancing decisions.

Yet another approach studies static component placement in a hierarchical stream acquisition architecture. A theoretical analysis of the problem is provided where the data rate is fixed, but there is no consideration of how the algorithm will adapt to dynamic changes in a network.

Another known algorithm provides a data flow aware load selection strategy that can help restrict the scattering of data flows and lead to lower communication cost. This approach does not minimize the end-to-end latency of queries, and the load balancing scheme is based on partner selection which assigns a fixed number of load balancing candidate partners for each node, and the load is moved individually for each machine between its partners.

Yet a further approach uses runtime monitoring information to adapt a decentralized placement algorithm that maximizes business utility which is defined as a function of the required bandwidth, available bandwidth and delay on a given edge of the network. This approach proposes stream management middleware in which nodes self-organize into a utility-aware set of clusters; and, thus, most reconfigurations only take place within clusters. Also, the algorithm does not explicitly compute the impact of reconfiguration on service times and uses fixed thresholds to determine when to perform reconfigurations. Therefore, fluctuations in network conditions may compel the algorithm to continuously reconfigure.

Still another approach addresses the problem of optimal component composition in a distributed stream processing environment by using a hybrid approach that combines distributed composition probing with course grain global state management on top of an overlay mesh. In this approach, an aggregation node periodically updates the global state with the states of all virtual links between all pairs of nodes in the overlay mesh at large time intervals. In addition to assuming the availability of course grain global state information, this approach does not address the issue of how to dynamically perform component placement when the components are not already deployed on the network.

Another approach uses an initial centralized algorithm to assign tasks to machines, and controls the data input and output rates and CPU allocation for each node in order to achieve stability in the face of dynamic changes in the runtime environment.

In general, current approaches to component placement in a network data processing system are not fully satisfactory, and it would be desirable to provide a decentralized mechanism for dynamically optimizing component placement in an event-driven component-oriented network data processing system that is subject to changes in function, infrastructure and/or performance.

BRIEF SUMMARY OF THE INVENTION

Exemplary embodiments provide a computer implemented method, system and computer usable program code for dynamic component placement in an event processing system that has at least one producer, at least one consumer, a plurality of nodes and a plurality of links between the at least one producer and the at least one consumer, and a flow graph that represents a plurality of computational components to be executed between the at least one producer and the at least one consumer, the computer implemented method running, in a decentralized manner without requiring any global state or centralized controller, on the plurality of nodes of the event processing system. A description of at least one change to the event processing system is received. At each node of the plurality of nodes, a plurality of next-hop neighbor nodes for each at least one consumer is identified. A routing value is assigned to each of the identified plurality of next-hop neighbor nodes for each at least one consumer to form routing values. Using the routing values in a context of the at least one change to the event processing system, a performance cost of the event processing system is estimated based on at least one hypothetical changed placement of the computational components of the flow graph at nodes along at least one path from a producer to a consumer through the next-hop neighbor nodes for each at least one consumer. Responsive to the estimating, a changed placement of the computational components of the flow graph that minimizes the performance cost of the event processing system relative to the at least one hypothetical changed placement is selected.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an exemplary embodiment when read in conjunction with the accompanying drawings, wherein:

FIG. 3A illustrates a network data processing system, FIG. 3B illustrates a plurality of components to be placed in the network data processing system of FIG. 3A, and FIG. 3C illustrates a placement of the plurality of components of FIG. 3B in the network data processing system of FIG. 3A to form an event-driven component-oriented network data processing system.

FIGS. 5A and 5B are diagrams that schematically illustrate a routing operation in accordance with an exemplary embodiment. FIG. 5A illustrates a forward portion of a routing operation from a producer to a consumer, and FIG. 5B illustrates a rearward portion of the routing operation from the consumer back to the producer.

FIG. 9A illustrates a current component placement, and FIG. 9B illustrates an updated component placement to reflect a change in the network data processing system in order to maintain optimal operation.

FIG. 10A illustrates a greedy simulated component placement, and FIG. 10B illustrates a component placement after load balancing of the greedy simulated component placement of FIG. 10A.

DETAILED DESCRIPTION OF THE PREFERRED EMBODIMENT

Figure 1:
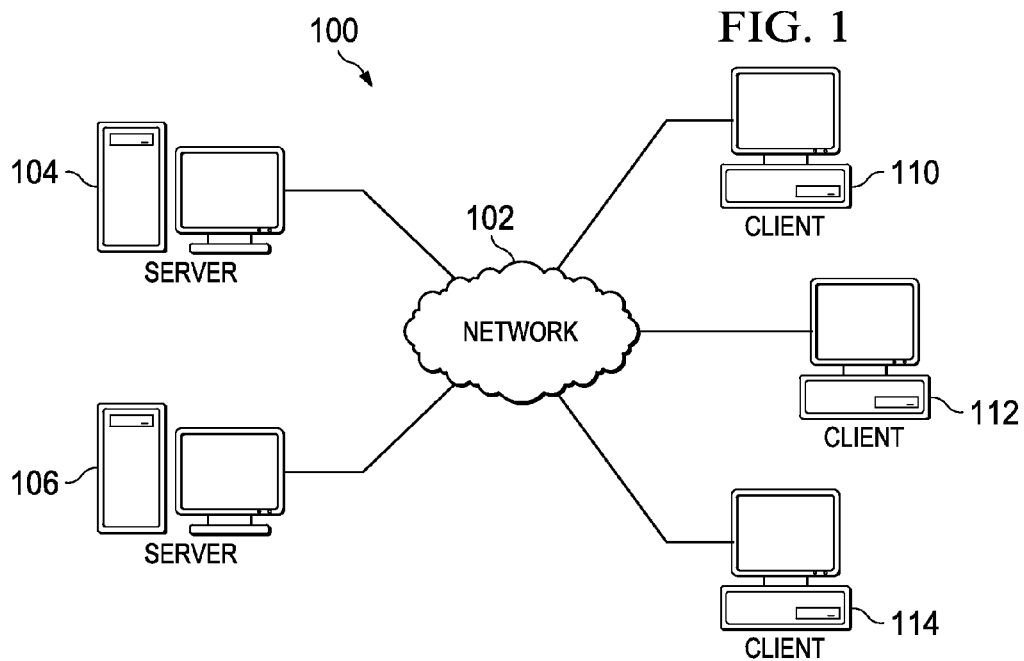
FIG. 1 depicts a pictorial representation of a network of data processing systems in which exemplary embodiments may be implemented.
Figure 2:
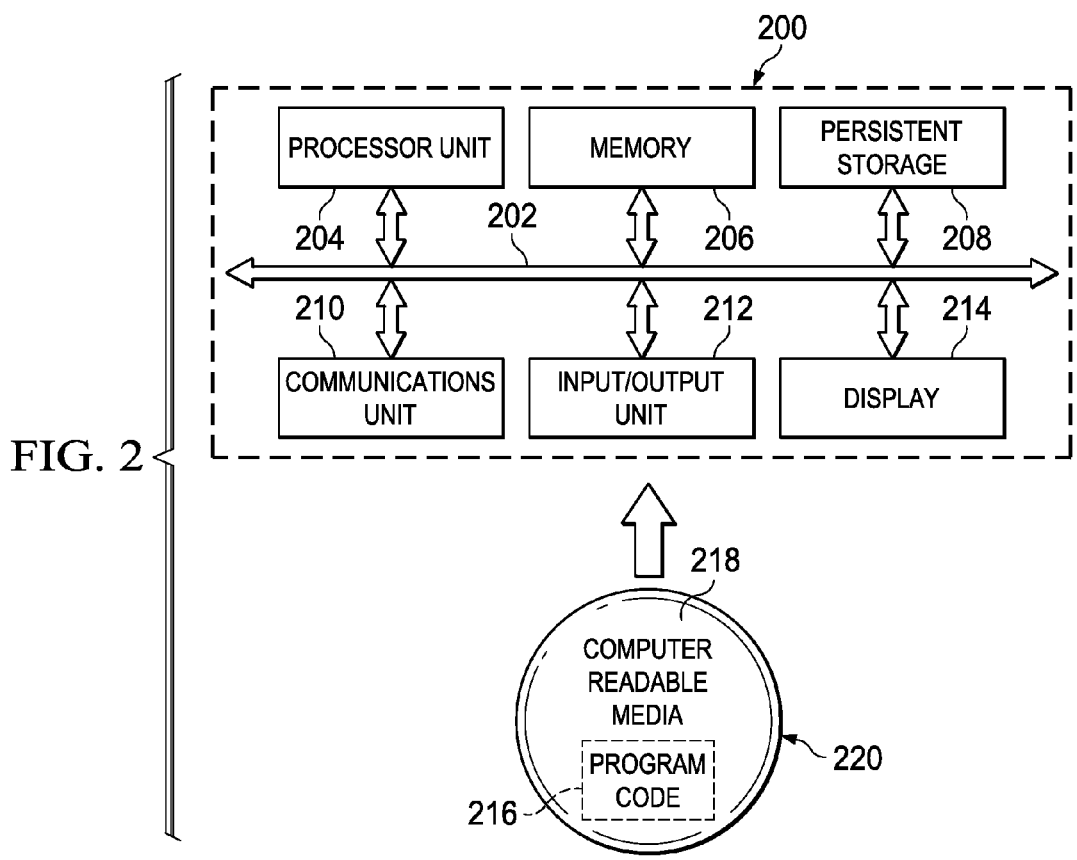
FIG. 2 is a diagram depicting a data processing system in accordance with an exemplary embodiment.

With reference now to the figures and in particular with reference to FIGS. 1-2, exemplary diagrams of data processing environments are provided in which exemplary embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which exemplary embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an exemplary embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 may be a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs may be located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 may be any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3A:
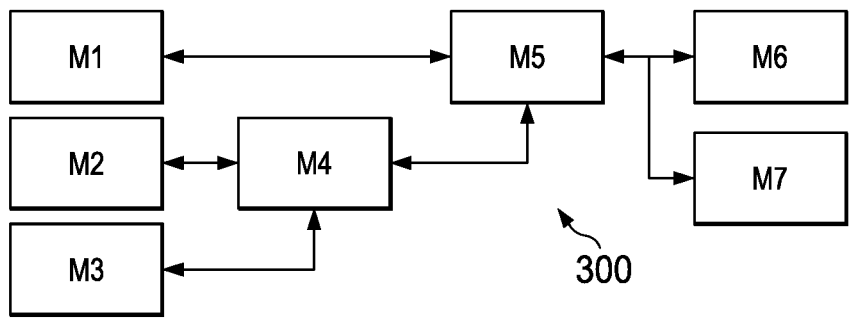
FIGS. 3A, 3B and 3C are diagrams that schematically illustrate component placement in a network data processing system to assist in explaining exemplary embodiments.
Figure 3B:
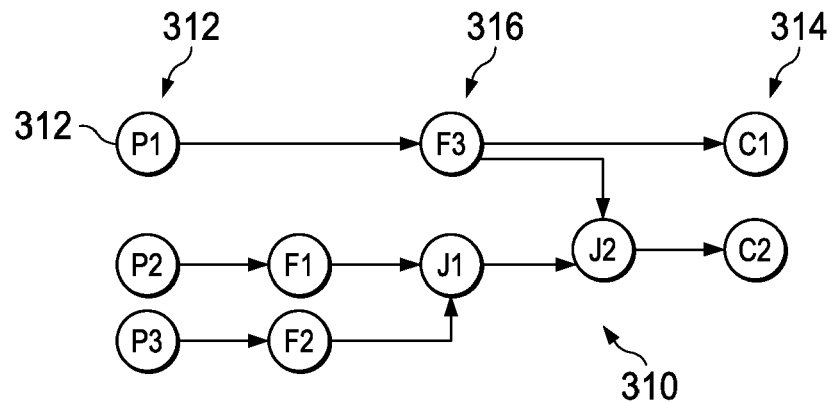
Figure 3C:
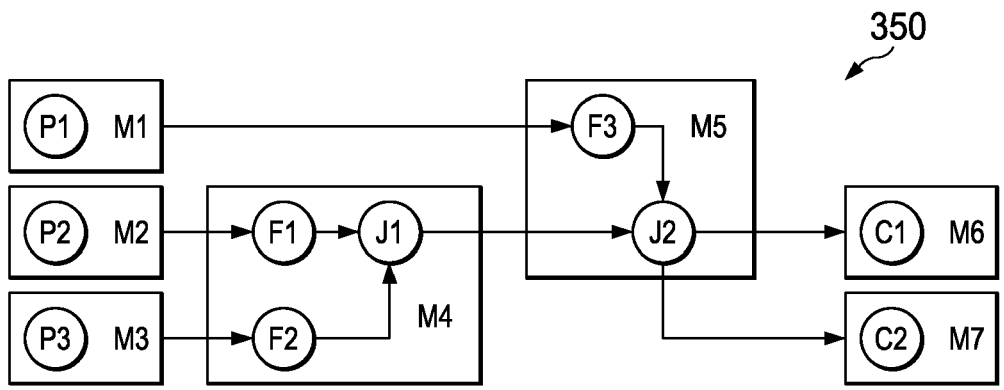

Exemplary embodiments provide a computer implemented method, system and computer usable program code for optimizing component placement in an event-driven component-oriented network data processing system which is subject to changes in function, infrastructure and/or performance. FIGS. 3A, 3B and 3C are diagrams that schematically illustrate component placement in a network data processing system to assist in explaining exemplary embodiments. In Particular, FIG. 3A illustrates a network data processing system, FIG. 3B illustrates a plurality of components to be placed in the network data processing system of FIG. 3A, and FIG. 3C illustrates a placement of the plurality of components of FIG. 3B in the network data processing system of FIG. 3A to form an event-driven component-oriented network data processing system, also referred to herein an "event processing system.".

The network data processing system illustrated in FIG. 3A is designated by reference number 300, and includes a plurality of machines M1-M7, also referred to herein as "nodes", that are interconnected to one another as represented by the arrows in the figure. Network data processing system 300 may be implemented, for example, as network 100 in FIG. 1, and machines M1-M7 may be implemented, for example, as servers 104 and 106 and/or clients 110, 112 and 114 in FIG. 1. In FIG. 3A, data may flow from left to right or from right to left as indicated by the arrows in the figure.

FIG. 3B illustrates a plurality of components to be placed in network data processing system 300. The plurality of components is designated by reference number 310, and includes a plurality of producer components P1, P2 and P3, generally designated by reference number 312, and sometimes referred to herein as "producers"; a plurality of consumer components C1 and C2, generally designated by reference number 314, and sometimes referred to herein as "consumers"; and a plurality of operator components F1, F2, F3, J1 and J2, generally designated by reference number 316, and sometimes referred to herein as "operators".

Producer components 312 are producers or sources of data, and consumer components 314 are recipients of data supplied by the producer components. Operator components 316 are located between the producer components and the consumer components and perform various operations or tasks with respect to the data produced by the producer components such that each consumer component will receive appropriate data in an appropriate format. Operator components 316 may include, for example, filter operators F1, F2 and F3; and computation operators J1 and J2. The arrows connecting the various components in FIG. 3B schematically illustrate data flow paths from the various producer components to the various consumer components via the operator components to provide appropriate data to the consumer components.

FIG. 3C illustrates a placement of the plurality of components of FIG. 3B in the network data processing system of FIG. 3A to form an event-driven component-oriented network data processing system. The event-driven component-oriented data processing system is designated by reference number 350, and, as shown, includes producer components P1, P2 and P3 which are pinned to machines M1, M2 and M3, respectively, and consumer components C1 and C2 which are pinned to machines M6 and M7, respectively. In addition, operator components F1, F2 and J1 are placed in machine M4 and operator components F3 and J2 are placed in machine M5.

It should be understood that the arrangement and number of machines illustrated in FIG. 3A, the arrangement and the number of components illustrated in FIG. 3B, and the particular component placement illustrated in FIG. 3C are intended to be exemplary only. Network data processing system 300 may include any number of machines arranged in any desired manner, components 310 may comprise any number of components arranged in any desired manner, and the component placement illustrated in FIG. 3C can be varied in any desired manner.

When components, such as components 310 illustrated in FIG. 3B, are placed into an available set of machines in a network data processing system, such as network data processing system 300 in FIG. 3A, it is desirable that the placement be optimized so as to minimize end-to-end latency for each path of data flow from a producer to a consumer. Although the component placement in event-driven component-oriented network data processing system 350 illustrated in FIG. 3C may be optimal for the particular arrangement of components shown in FIG. 3A and the particular arrangement of machines illustrated in FIG. 3B, the component placement may not be optimal if one or more changes occur in system 350. Such changes that may occur include, for example:

1. Changes in Function:
   a. Producers or consumers may be added or deleted.
   b. Components may be added, deleted or modified.
2. Changes in Performance characteristics:
   a. Message rates from producers may change.
   b. Data may change causing workload on different operators to change.
3. Changes in Infrastructure
   a. Server capacities may change or servers may go on or off line.
   b. Links between servers may become congested or unavailable.

When one or more changes occur in an event-driven component-oriented network data processing system, a current component placement may no longer be optimal, and it may be desirable to adjust the component placement so as to maintain optimal performance notwithstanding the one or more changes.

Figures 4, 6:
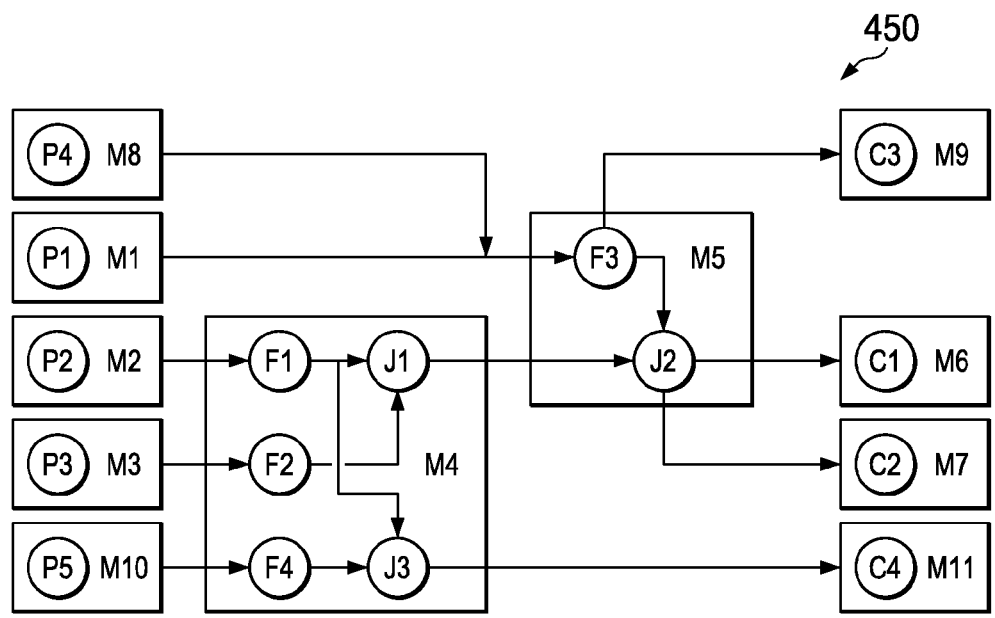
FIG. 4 is a diagram that illustrates a modified event-driven component-oriented network data processing system to assist in explaining exemplary embodiments.
FIG. 6 schematically illustrates a routing table at a node in an event-driven component-oriented network data processing system according to an exemplary embodiment.

FIG. 4 is a diagram that illustrates a modified event-driven component-oriented network data processing system to assist in explaining exemplary embodiments.

In particular, FIG. 4 illustrates an event-driven component-oriented network data processing system 450 that differs from event-driven component-oriented network data processing system 350 in FIG. 3C by including additional producer components P4 and P5 pinned in additional machines M8 and M10, respectively; additional consumer components C3 and C4 pinned in additional machines M9 and M11, respectively, and additional operator components F4 and J3. It would be desirable, in view of such changes, to adjust the placement of the operator components so as to maintain an optimal component placement. In FIG. 4, new operator components F4 and J3 have been placed in machine M4 while other operator components have been left unchanged.

In order to be able to effectively respond to changes in an event-driven component-oriented network data processing system, a mechanism is needed that can determine the component placement changes that are necessary to maintain optimum system operation and to then make the necessary changes dynamically at runtime in a distributed manner and without centralized control.

Exemplary embodiments provide a computer implemented method, system and computer usable program code for optimizing component placement in an event-driven component-oriented network data processing system comprising at least one producer, at least one consumer, and a plurality of nodes between the at least one producer and the at least one consumer. Exemplary embodiments optimize component placement dynamically in a manner that is decentralized, that re-uses already deployed component flows and that estimates queuing delays resulting from changes in placement so as to minimize instability.

A computer implemented method, system and computer usable program code for optimizing component placement in a network data processing system according to an exemplary embodiment utilizes a biologically-inspired algorithm in which task placement can be described in terms of activities performed by a colony of ants while searching for and locating food supplies, and in notifying other ants in the colony of the best paths to the food supplies. More particularly, exemplary embodiments provide a plurality of routing probes, corresponding to routing ants, which perform a routing operation to identify possible paths through a network from a producer (home) to a consumer (food supply), and assign routing values to each of the discovered paths representing the time taken to traverse the paths. A plurality of scouting probes (scouting ants) then estimates the performance cost of component placements at nodes along at least those paths that are designated by the routing values as being the best paths during a scouting operation. Components are then placed at nodes in the network in accordance with the results of the simulations so as to provide an optimal component placement. By continually performing the routing, scouting and placement operations, a component placement mechanism according to exemplary embodiments is able to dynamically adapt to changes in an event-driven component-oriented network data processing system to maintain optimal component placement notwithstanding changes in the system.

FIGS. 5A and 5B are diagrams that schematically illustrate a routing operation in accordance with an exemplary embodiment. FIG. 5A illustrates a forward portion of a routing operation, generally designated by reference number 500, from a producer to a consumer, and FIG. 5B illustrates a rearward portion of the routing operation from the consumer back to the producer. Referring to FIG. 5A, it is assumed that it is desired to transmit a message (query) from producer P2 in machine M2 to consumer C2 in machine M7. The goal is to send the message from P2 to C2 via the optimal path. To identify the optimal path, a routing operation is performed. According to an exemplary embodiment, the routing operation begins by producer P2 sending out a plurality of routing probes, one of the plurality of routing probes being represented in FIG. 5A by routing ant 510 in the ant colony analogy described herein.

Upon being released by producer P2, the routing probe first travels to node (machine) M4, and thereafter, from node M4 to node M5 (as shown at 510A), and then to consumer C2 in node M7 (as shown at 510B). Other routing probes may take other paths. For example, FIG. 5A also illustrates a second routing ant 520 that has taken a different path, via node M8, to consumer C2. As will be explained hereinafter, as routing probes move through the network, they select paths to consumer C2 based on routing values that have been assigned to different paths from one node to another by routing probes that have previously traveled through the network. In accordance with an exemplary embodiment, each routing probe uses the routing values at each node to make a probabilistic choice for each hop from one node to a next-hop neighbor node as it travels through the network.

Referring now to FIG. 5B, when each routing probe reaches consumer C2 at node M7, it turns around and retraces its path back to producer P2 at node M2. Thus, as shown in FIG. 5B, routing ant 510 travels from M7 to M5 (as shown at 510C), from M5 to M4 (as shown at 510D) and from M4 to M2 (as shown at 510E). Similarly, routing ant 520 also retraces its path back to M2 via node M8 as shown at 520A. As the routing ants (routing probes) travel from node to node during their return trip to M2, they deposit pheromones (i.e., update the routing values) at each node for the paths they have taken. In this way, the next routing probes that are sent out by P2 or another producer will have updated routing values to assist in selecting a path to C2 or to another consumer.

According to an exemplary embodiment, the "pheromones" deposited by the ants returning to the producer represent adjustments to a routing table that is provided at each node in the event-driven component-oriented network data processing system.

FIG. 6 schematically illustrates a routing table at a node in an event-driven component-oriented network data processing system according to an exemplary embodiment. The node may, for example, be one of nodes M4, M5 and M8 in FIGS. 5A and 5B. The routing table is designated by reference number 600 and includes a plurality of destination columns 602A, 602B, ... 602N; and a plurality of neighbor rows 604A, 604B, ... 604N. An entry at an intersection between each column and row represents the probability of going to a particular destination from the particular node at which the routing table is located via a particular next-hop neighbor node. Thus, routing table entry 610 at the intersection of column 602A and row 604A represents a probability of choosing neighbor node 1 as the next hop on the path to destination 1 from the particular node. Similarly, routing table entry 620 represents a probability of choosing neighbor node 2 as the next hop on the path to destination 1 from the particular node, routing table entry 630 represents a probability of choosing neighbor node 1 as the next hop when going to destination 2 from the particular node and routing table entry 640 represents a probability of choosing neighbor 2 as the next hop when going to destination 2 from the particular node. These routing table values are between 0 (zero percent probability) and 1 (one hundred percent probability). It should be understood that a routing table at a particular node will include entries corresponding to all destinations and next-hop neighbor nodes in the event-driven component-oriented network data processing system within which it is utilized. The sum of the probabilities in each column of the routing table is always 1.

Figure 7:
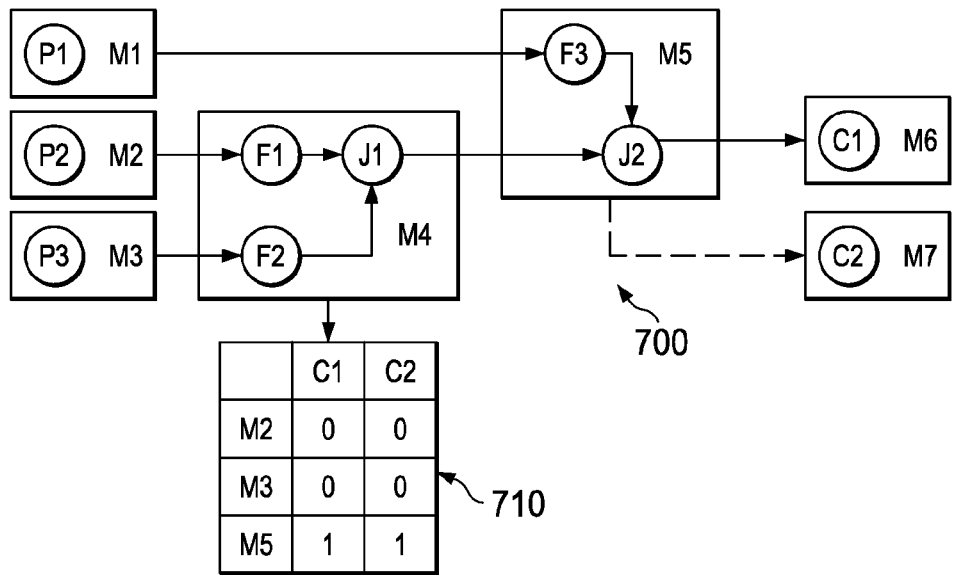
FIG. 7 is a diagram that schematically illustrates use of a routing table in an event-driven component-oriented network data processing system according to an exemplary embodiment.

FIG. 7 is a diagram that schematically illustrates use of a routing table in an event-driven component-oriented network data processing system according to an exemplary embodiment. The event-driven component-oriented network data processing system is designated by reference number 700, and FIG. 7 illustrates routing table 710 at node M4 in the network. It should be understood that although not illustrated in FIG. 7, a routing table is also provided at node M5 in the network. A routing table may also be provided at one or more of producer machines M1, M2 and M3, if the producer machine has more than one outbound path, which is not the case in system 700 illustrated in FIG. 7. Consumer machines M6 and M7 are a final destination in system 700 and have no need for routing tables.

As shown in FIG. 7, routing table 710 includes entries representing the probabilities of choosing neighbor nodes M2, M3 and M5 as the next hop when going from machine M4 to either consumer C1 or C2. As shown in routing table 710, the probability of choosing nodes M2 or M3 as the next hop when going to either C1 or C2 is zero. On the other hand, the probability of choosing neighbor node M5 as the next hop from node M4 when going to node C1 is 1 and the probability of choosing node M5 as the next hop from node M4 when going to neighbor C2 is 1. Based on these routing values, routing probes are significantly more likely to travel to C1 or C2 via M5 than via M2 or M3.

Figure 8:
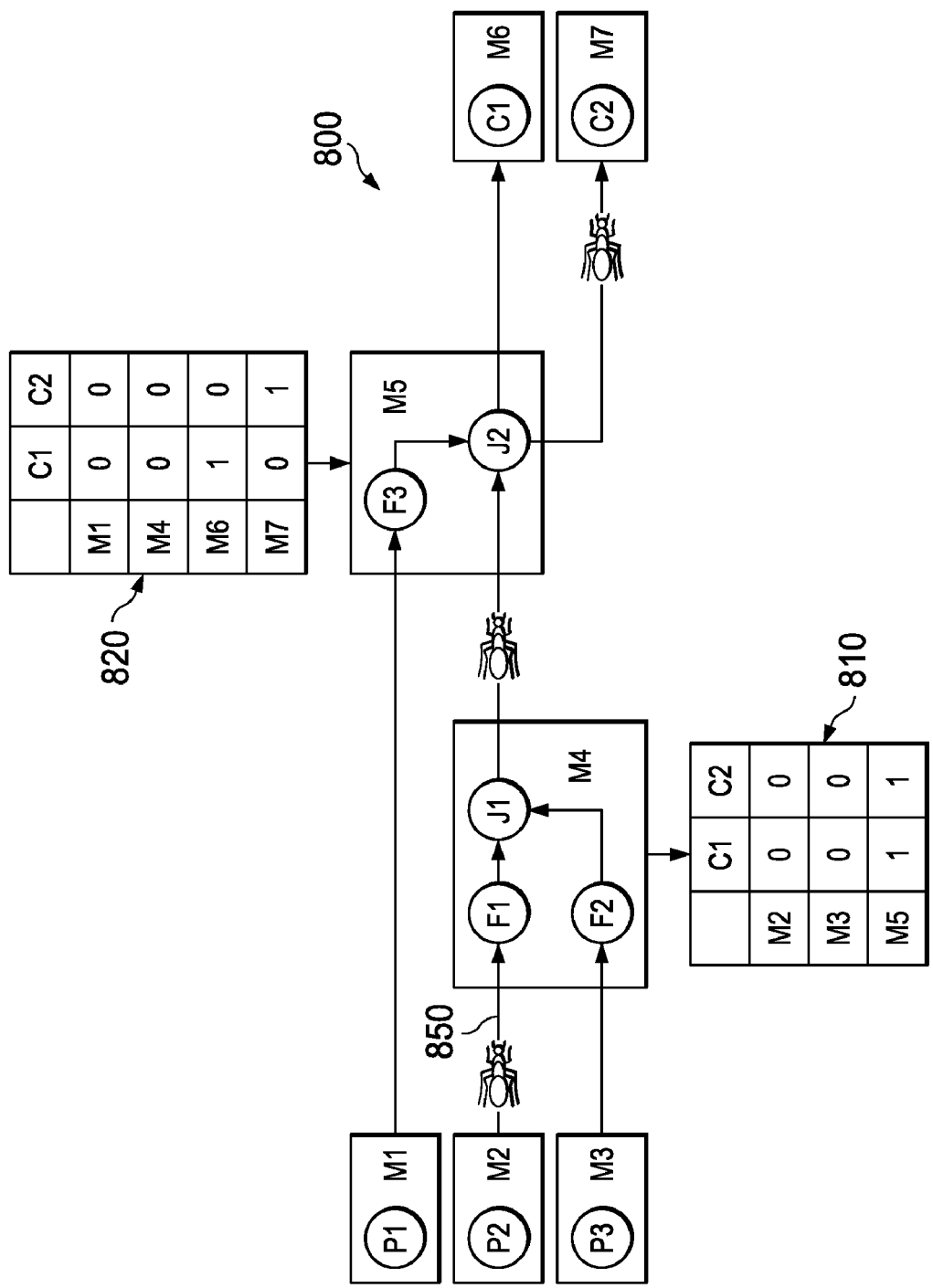
FIG. 8 is a diagram that schematically illustrates a mechanism for adjusting routing values in a routing table in an event-driven component-oriented network data processing system according to an exemplary embodiment.

FIG. 8 is a diagram that schematically illustrates a mechanism for adjusting routing values in a routing table in an event-driven component-oriented network data processing system according to an exemplary embodiment. The event-driven component-oriented network data processing system is designated by reference number 800, and includes nodes M4 and M5 having routing tables 810 and 820, respectively. As shown, producer M2 of a given query releases a plurality of scouting probes (only one scouting ant 850 is illustrated in the Figure). The goal of each ant is to reach the consumer of the query (consumer C2 in this example). As each routing probe reaches node M4 in network 800, it selects a path from M4 to C2 via a next-hop neighbor node of M4 based on the current routing values in its routing table 810. Based on the values in routing table 810, the routing probes are most likely to select the path to node M5. In a similar manner, based on the values in routing table 820 at node M5, the routing probes are most likely to select the path from M5 to C2 in node M7 rather than another path.

Each routing probe will store (within itself) some information at every node it visits on its way from its source, a producer, to its destination, a consumer. This information is an information pair comprising a node ID and a time. When a routing probe reaches its destination (C2 in machine M7), it turns backwards and retraces its steps as described previously, using the node information it had stored. As the routing probe retraces its path back to the producer, it updates the routing table values at every node (the values are a function of the time that it took the routing probe to go from the node to the consumer) using the time information it had stored. In this way, the table values are constantly updated with new probability values.

During a first scouting operation, because there is no prior information regarding paths to a consumer upon which to base a route selection, the paths are randomly selected. By releasing a sufficient number of routing probes, all possible paths will be tried, and highly accurate routing tables will gradually be developed at each node.

By releasing routing probes periodically or continuously, the routing tables will be periodically or continuously adjusted to reflect changes in the probabilities of traveling from a producer to a consumer via different paths. As a result, if there are any changes in the event-driven component-oriented network data processing system, for example, changes in function, performance characteristics or infrastructure, that might necessitate a change in the path from a producer to a consumer in order to maintain optimal performance, the routing probes will recognize such changes by virtue of traveling through the network, and automatically adjust the values in the routing tables at each node to reflect the changes.

Following a routing operation as described above, a scouting operation is performed to select locations for component placement in the network data processing system. In accordance with an exemplary embodiment, during a scouting operation, a number of scouting probes are released from the query producer. These scouting probes are guided from the producer to the query consumer via paths identified by the routing probes. The scouts probabilistically select their paths, guided by the routing value concentrations for the next hop at each node, and proceed to simulate placement. Simulating placement is equivalent to estimating the performance cost of hypothetically placing the operator components on the nodes in the path the scouts chose to the destination node The successful scouting probes memorize their path, and send a report back to the producer that details the results of their simulated placement. The producer records and compares all the reports sent by the scouting probes that it released. The producer selects the placement of the scouting probe that recorded the lowest performance cost and executes this placement by sending placement effectors to make the placement.

If a placement request involves an operator component already placed in the network, the scouting probes will attempt to reuse the computed result of this placed operator component rather than duplicate its placement elsewhere in the network. This is referred to herein as operator component "reuse."

Figure 9A:
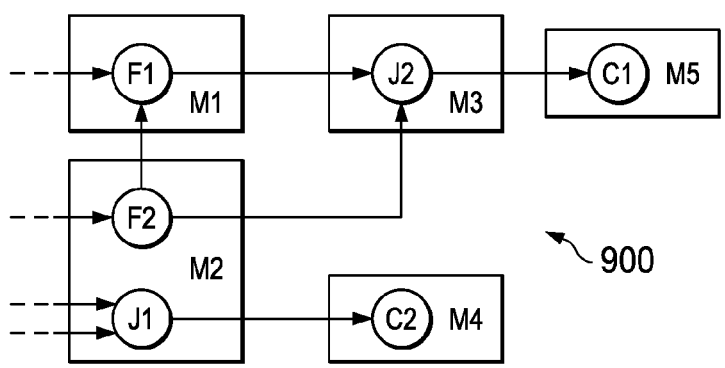
FIGS. 9A and 9B are diagrams that schematically illustrate updating of component placement in an event-driven component-oriented network data processing system according to an exemplary embodiment.
Figure 9B:
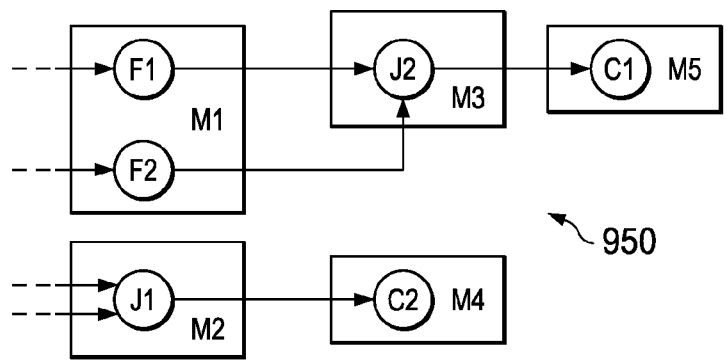

FIGS. 9A and 9B are diagrams that schematically illustrate updating of component placement in an event-driven component-oriented network data processing system according to an exemplary embodiment. FIG. 9A illustrates a current component placement, and FIG. 9B illustrates an updated component placement to reflect a change in the network data processing system in order to maintain optimal operation.

FIG. 9A illustrates a current component placement 900, and FIG. 9B illustrates an updated component placement 950 in which operator component F2 was moved from node M2 to node M1. This change in operator component placement is as a result of a change in the network data processing system that resulted in a change in routing values in one or more routing tables at one or more nodes, and was determined to be a best new component placement after scouting probes estimated the performance cost of different possible placement options and reported the options and their costs back to the producer. The producer selects a new placement with the lowest performance cost and sends placement effectors to make the necessary changes.

According to an exemplary embodiment, optimal component placement considers the performance cost of placing operators on a given node, given stream data rates, queuing delay and processing delay on that node. A scouting probe will continue to hypothetically place operators on a given node as long as the estimated performance cost of the hypothetical placement is above an acceptable threshold. This is referred to herein as "greedy" component placement. Once a point has been reached where the estimated performance cost of hypothetically placing further operators on this node is not acceptable, the scouting probe with probabilistically select the next node in its path, guided by the routing values in the routing table. It will then attempt to hypothetically place the remaining operator components on the next node by doing greedy component placement.

Figure 10A:
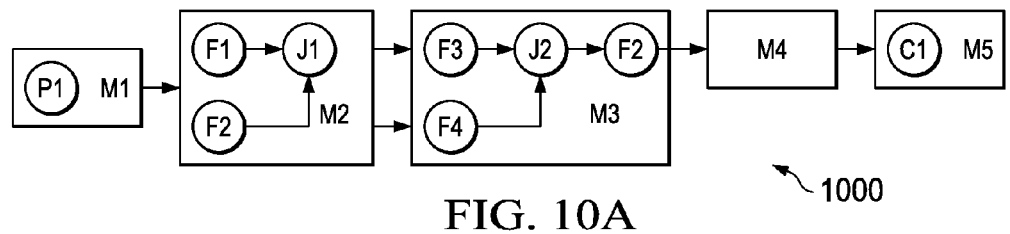
FIGS. 10A and 10B are diagrams that schematically illustrate simulated component placement during a scouting operation according to an exemplary embodiment.
Figure 10B:
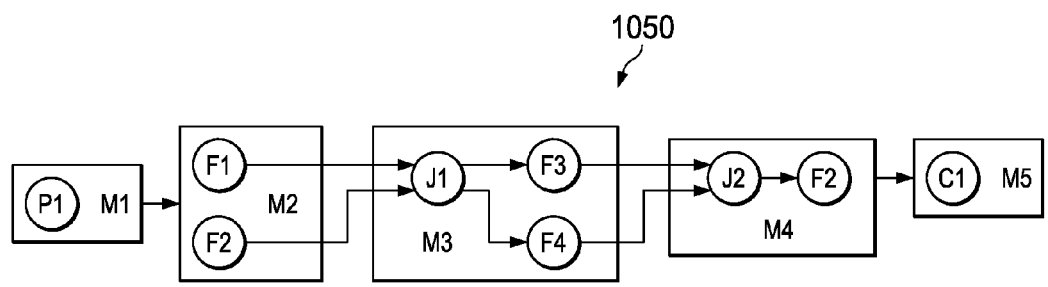

FIGS. 10A and 10B are diagrams that schematically illustrate simulated component placement during a scouting operation according to an exemplary embodiment. FIG. 10A illustrates a greedy simulated component placement, and FIG. 10B illustrates a component placement after load balancing of the greedy simulated component placement of FIG. 10A.

As shown in FIG. 10A, a component placement simulation initially utilizes an existing component placement, designated by reference number 1000, within the network data processing system. After consideration of the cost of placing operators on given nodes in system 1000, it may be determined that load balancing is required such that component J1 is moved to node M3 from node M2, and components J2 and F2 are moved to node M4 from node M3. FIG. 10B illustrates component placement 1050 after load balancing of the greedy component placement illustrated in FIG. 10A. Thus, exemplary embodiments address both load balancing and communication costs when selecting optimal component placement.

In accordance with an exemplary embodiment, by continually funneling routing and scouting probes in the network, and by periodically updating the routing tables, exemplary embodiments are able to dynamically adapt to changes in topology, user queries and node characteristics of the network without any centralized control.

Figure 11:
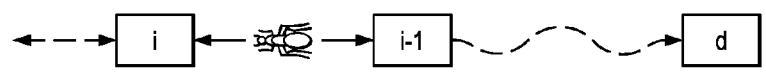
FIG. 11 illustrates a way of computing the routing value in a routing table according to an exemplary embodiment.

FIG. 11 illustrates one possible way of computing an initial routing value r in a routing table in a node i when a routing probe returns from a destination (consumer) d via a next-hop neighbor node i−1. $T_{i \to d}$ and $o^r_{i-1}$ and $l_{i-1}$ are assumed to be known. $T_{i \to d}$ represents the total time taken to go from node i to node d. $o^r_{i-1}$ represents the number of reusable operators on node i−1. $l_{i-1}$ represents the load on node i−1. The $k_i$ terms represent weights. More precisely, $k_1$ represents the weight of $T_{i \to d}$, $k_2$ represents the weight of $o^r_{i-1}$, and $k_3$ represents the weight of $l_{i-1}$. $k_i$ is estimated by formulating the algorithm as a non-linear program and solving using non-linear optimization techniques.

Figure 12:
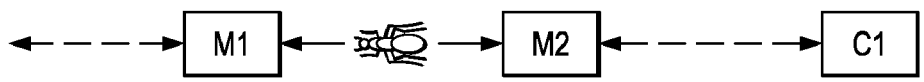
FIG. 12 illustrates updating of routing values in a routing table once they have been computed using the algorithm of FIG. 11 according to an exemplary embodiment.

FIG. 12 illustrates algorithms for updating routing values in a routing table once the initial values have been computed using the algorithm of FIG. 11 according to an exemplary embodiment. The first algorithm illustrates how the routing value r for the path from node M1 to node C1 by choosing node M2 as the next hop, is reinforced by the routing probe. The term $r_{M2,C1}^{M1}(t)$ represents the routing value at node M1 for the path from node M1 to node C1 by choosing node M2 as the next hop at time unit t. The term $r_{M2,C1}^{M1}(t+1)$ represents the routing value at node M1 for the path from node M1 to node C1 by choosing node M2 as the next hop at time unit t+1. The term r represents the most recently computed routing value using the algorithm of FIG. 11 according to an exemplary embodiment. The second algorithm illustrates how the routing value r for a path from node M1 to node C1 by choosing any other node n that is not node i−1 as the next hop, is decayed by the routing probe. The term $r_{n,C1}^{M1}(t)$ represents the routing value r for a path from node M1 to node C1 by choosing any other node n that is not node i−1 as the next hop, at time unit t. The term $r_{n,C1}^{M1}(t+1)$ represents the routing value r for a path from node M1 to node C1 by choosing any other node n that is not node i−1 as the next hop, at time unit t+1. The term r represents the most recently computed routing value using the algorithm of FIG. 11 according to an exemplary embodiment.

It should be understood that the algorithms illustrated in FIGS. 11 and 12 are intended to be exemplary only as other algorithms may also be utilized.

Figure 13:
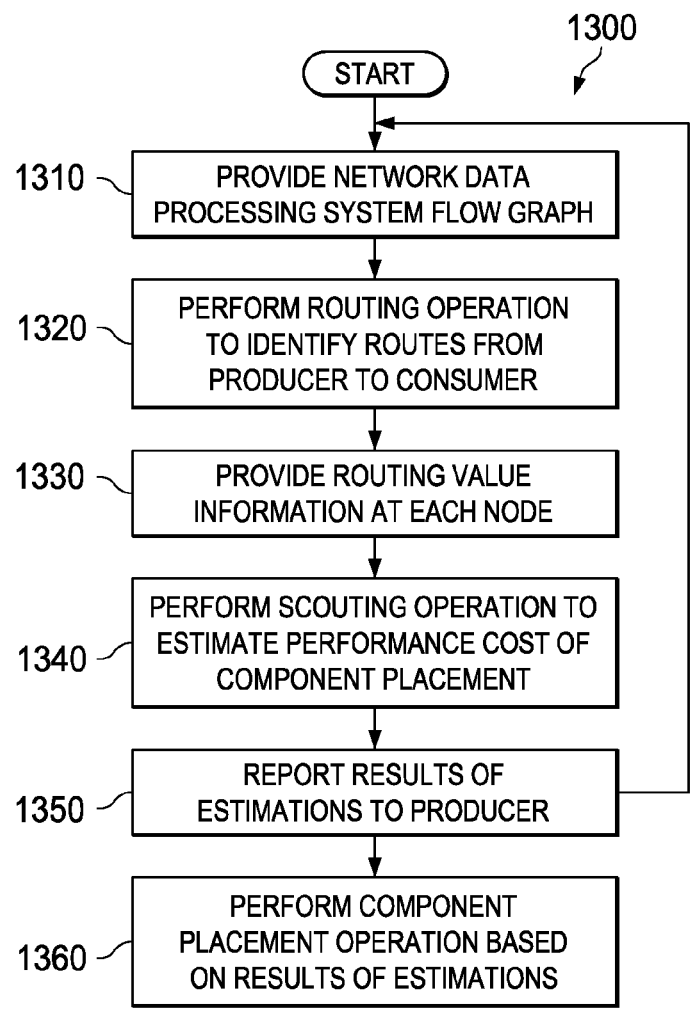
FIG. 13 is a flowchart that illustrates a method for dynamic and decentralized component placement in an event-driven component-oriented network data processing system according to an exemplary embodiment.

FIG. 13 is a flowchart that illustrates a method for dynamic component placement in an event-driven component-oriented network data processing system according to an exemplary embodiment. The method is designated by reference number 1300 and begins by providing an event-driven component-oriented network data processing system that includes at least one producer, at least one consumer, a plurality of nodes and a plurality of links between the at least one producer and the at least one consumer as well as a flow graph that consists of a series of operator components through which data should flow in a designated manner (Step 1310). Any changes in network infrastructure, performance characteristics or flow graph that are identified are also included here. A routing operation is then performed to identify each path from a producer of the at least one producer to a consumer of the at least one consumer (Step 1320). According to an exemplary embodiment, the routing operation includes identifying, at each node of the plurality of nodes, a plurality of next-hop neighbor nodes for each at least one consumer. Routing value information is then provided at each node (Step 1330). According to an exemplary embodiment, a routing value is assigned to each of the identified plurality of next-hop neighbor nodes for each at least one consumer, and represents the amount of time required for routing probes to go from that node to the consumer via each route. The routing weight could also represent other network related characteristics.

A scouting operation is then performed to estimate the performance cost of placement of components at nodes along at least one path of the plurality of paths identified during the routing operation (Step 1340). According to an exemplary embodiment, the estimate of the performance cost may be made using the routing values in the context of at least one change to the event processing system based on at least one hypothetical changed placement of the computational components of the flow graph at nodes along at least one path from a producer to a consumer through next-hop neighbor nodes for each at least one consumer. Results of the estimations are then reported to the producer (Step 1350), and a component placement operation is performed based on the results of the estimations (Step 1360).

Following a component placement operation at Step 1360, the method returns to step 1310 to repeat the routing, scouting and component placement operations to reflect any changes that might occur in the event-driven component-oriented network data processing system.

Figure 14:
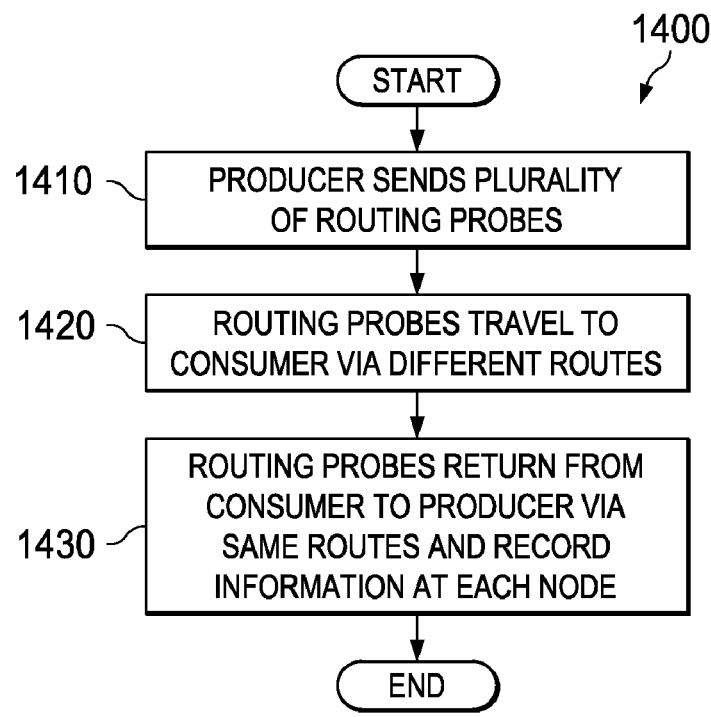
FIG. 14 is a flowchart that illustrates a routing operation in an event-driven component-oriented network data processing system according to an exemplary embodiment.

FIG. 14 is a flowchart that illustrates a routing operation in an event-driven component-oriented network data processing system according to an exemplary embodiment. The routing operation may be implemented, for example, as Step 1320 in FIG. 13. As shown, a producer sends out a plurality of routing probes (Step 1410). The plurality of routing probes travel to a consumer via different paths based upon routing value information at each node in the network and record some information at each step (Step 1420). After reaching the consumer, each routing probe returns to the producer along the same route traveled to the consumer (Step 1430) so as to be able to provide routing value information gathered during the trip to the consumer to each node during the return trip from the consumer.

Figure 15:
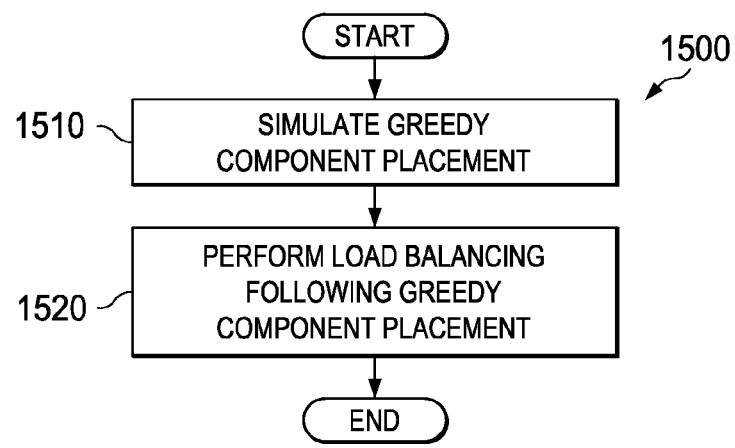
FIG. 15 is a flowchart that illustrates a scouting operation in an event-driven component-oriented network data processing system according to an exemplary embodiment.

FIG. 15 is a flowchart that illustrates a scouting operation in an event-driven component-oriented network data processing system according to an exemplary embodiment. The scouting operation may be implemented, for example, as Step 1340 in FIG. 13. The method begins by simulating a greedy component placement wherein a current component placement is simulated (Step 1510). Load balancing is then performed following greedy component placement to reflect the cost of placing operators on a given node, given stream data rates, queuing delay and processing delay on that node (Step 1520).

Exemplary embodiments thus provide a computer implemented method, system and computer usable program code for dynamic component placement in an event processing system that has at least one producer, at least one consumer, a plurality of nodes and a plurality of links between the at least one producer and the at least one consumer, and a flow graph that represents a plurality of computational components to be executed between the at least one producer and the at least one consumer, the computer implemented method running, in a decentralized manner without requiring any global state or centralized controller, on the plurality of nodes of the event processing system. A description of at least one change to the event processing system is received. At each node of the plurality of nodes, a plurality of next-hop neighbor nodes for each at least one consumer is identified. A routing value is assigned to each of the identified plurality of next-hop neighbor nodes for each at least one consumer to form routing values. Using the routing values in a context of the at least one change to the event processing system, a performance cost of the event processing system is estimated based on at least one hypothetical changed placement of the computational components of the flow graph at nodes along at least one path from a producer to a consumer through the next-hop neighbor nodes for each at least one consumer. Responsive to the estimating, a changed placement of the computational components of the flow graph that minimizes the performance cost of the event processing system relative to the at least one hypothetical changed placement is selected.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dynamic component placement in an event processing system that has at least one producer, at least one consumer, a plurality of nodes and a plurality of links between the at least one producer and the at least one consumer, and a flow graph that represents a plurality of computational components to be executed between the at least one producer and the at least one consumer, the computer implemented method running, in a decentralized manner without requiring any global state or centralized controller, on the plurality of nodes of the event processing system, comprising:
   receiving a description of at least one change to the event processing system;
   identifying each path from each at least one producer to each at least one consumer;
   responsive to identifying each path, identifying, at each node along each path, a plurality of next-hop neighbor nodes;
   assigning a routing value to each of the identified plurality of next-hop neighbor nodes for each at least one consumer to form routing values, wherein assigning the routing value to each of the identified plurality of next-hop neighbor nodes comprises:
   sending a plurality of routing probes from a producer of the at least one producer, the plurality of routing probes each traveling to a consumer of the at least one consumer via different paths based on a current routing value at each node in the event processing system; and
   each of the plurality of routing probes returning to the producer of the at least one producer along the same path traveled to the consumer to provide updated routing values to each node during the returning from the consumer to the producer;
   estimating, using the routing values in a context of the at least one change to the event processing system, a performance cost of the event processing system based on at least one hypothetical changed placement of the computational components of the flow graph at nodes along at least one of the paths; and
   responsive to the estimating, selecting a changed placement of the computational components of the flow graph that minimizes the performance cost of the event processing system relative to the at least one hypothetical changed placement.

2. The computer implemented method of claim 1, wherein the at least one change to the event processing system includes at least one of addition of at least one producer, addition of at least one consumer, deletion of at least one producer, deletion of at least one consumer, at least one change to the flow graph, at least one change to event rates, at least one change to performance properties of the computational components, and at least one change to physical infrastructure of the event processing system.

3. The computer implemented method of claim 1, wherein the selecting step comprises:
   reusing existing computational components of the flow graph when possible.

4. The computer implemented method of claim 1, wherein assigning a routing value to each of the identified plurality of next-hop neighbor nodes comprises:
   providing a routing table at each node, wherein an entry of the routing table at each node indicates a probability of choosing a particular next-hop neighbor node to forward data to the consumer from the node.

5. The computer implemented method of claim 4, wherein the probability is a function of one or more metrics of event processing system usage, the one or more metrics including one or more of a time required for data to travel from the node to the consumer, and bandwidth consumed by a message traveling to the consumer, and one or more other metrics.

6. The computer implemented method of claim 1, wherein estimating, using the routing values in a context of the at least one change to the event processing system, at least one hypothetical changed placement of the computational components of the flow graph at nodes along at least one path from a producer of the at least one producer to a consumer of the at least one consumer, comprises:
   estimating how performance would be affected by the at least one hypothetical changed placement to form estimate results; and
   reporting the estimate results to the producer of the at least one producer, and wherein selecting a changed placement of the computational components of the flow graph comprises:
   the producer of the at least one producer selecting the changed placement based on the estimate results.

7. The computer implemented method of claim 1, and further comprising:

repeating the identifying, assigning, estimating and selecting steps on a continuous or periodic basis.

8. A computer program product, comprising:
a non-transitory computer recordable medium having computer usable program code for dynamic component placement in an event processing system that has at least one producer, at least one consumer, a plurality of nodes and a plurality of links between the at least one producer and the at least one consumer, and a flow graph that represents a plurality of computational components to be executed between the at least one producer and the at least one consumer, the computer usable program code running, in a decentralized manner without requiring any global state or centralized controller, on the plurality of nodes of the event processing system, the computer program product comprising:
computer usable program code configured for receiving a description of at least one change to the event processing system;
computer usable program code configured for identifying each path from each at least one producer to each at least one consumer;
computer usable program code configured for, responsive to identifying each path, identifying, at each node along each path, a plurality of next-hop neighbor nodes;
computer usable program code configured for assigning a routing value to each of the identified plurality of next-hop neighbor nodes for each at least one consumer to form routing values, wherein the computer usable program code configured for assigning a routing value to each of the identified plurality of next-hop neighbor nodes for each at least one consumer comprises:
computer usable program code configured for sending a plurality of routing probes from a producer of the at least one producer, the plurality of routing probes each traveling to a consumer of the at least one consumer via different paths based on a current routing value at each node in the event processing system; and
computer usable program code configured for each of the plurality of routing probes to return to the producer of the at least one producer along the same path traveled to the consumer to provide updated routing values to each node during the returning from the consumer to the producer;
computer usable program code configured for estimating, using the routing values in a context of the at least one change to the event processing system, a performance cost of the event processing system based on at least one hypothetical changed placement of the computational components of the flow graph at nodes along at least one of the paths; and
responsive to the estimating, computer usable program code configured for selecting a changed placement of the computational components of the flow graph that minimizes the performance cost of the event processing system relative to the at least one hypothetical changed placement.

9. The computer program product of claim 8, wherein the at least one change to the event processing system includes at least one of addition of at least one producer, addition of at least one consumer, deletion of at least one producer, deletion of at least one consumer, at least one change to the flow graph, at least one change to event rates, at least one change to performance properties of the computational components, and at least one change to physical infrastructure of the event processing system.

10. The computer program product of claim 8, wherein the computer usable program code configured for selecting a changed placement of the computational components of the flow graph that minimizes the performance cost of the event processing system relative to the at least one hypothetical changed placement comprises:
computer usable program code configured for reusing existing computational components of the flow graph when possible.

11. The computer program product of claim 8, wherein the computer usable program code configured for assigning a routing value to each of the identified plurality of next-hop neighbor nodes for each at least one consumer comprises:
computer usable program code configured for providing a routing table at each node, wherein an entry of the routing table at each node indicates a probability of choosing a particular next-hop neighbor node to forward data to the consumer from the node.

12. The computer program product of claim 11, wherein the probability is a function of one or more metrics of event processing system usage, the one or more metrics including one or more of a time required for data to travel from the node to the consumer, bandwidth consumed by a message traveling to the consumer, and one or more other metrics.

13. The computer program product of claim 8, wherein the computer usable program code configured for estimating, using the routing values in a context of the at least one change to the event processing system, a performance cost of the event processing system based on at least one hypothetical changed placement of the computational components of the flow graph at nodes along at least one path from a producer to a consumer through the next-hop neighbor nodes for each at least one consumer, comprises:
computer usable program code configured for estimating how performance would be affected by the at least one hypothetical changed placement to form estimate results; and
computer usable program code configured for reporting the estimate results to the producer of the at least one producer, and wherein the computer usable program code configured for selecting a changed placement of the computational components of the flow graph that minimizes the performance cost of the event processing system relative to the at least one hypothetical changed placement comprises:
computer usable program code configured for the producer of the at least one producer to select the changed placement based on the estimate results.

14. The computer program product of claim 8, and further comprising:
computer usable program code configured for repeating the identifying, assigning, estimating and selecting steps on a continuous or periodic basis.

15. A dynamic component placement system in an event processing system that has at least one producer, at least one consumer, a plurality of nodes and a plurality of links between the at least one producer and the at least one consumer, and a flow graph that represents a plurality of computational components to be executed between the at least one producer and the at least one consumer, the dynamic component placement system running, in a decentralized manner without requiring any global state or centralized controller, on the plurality of nodes of the event processing system, the dynamic component placement system comprising:
a bus;
a communications unit connected to the bus;

a memory connected to the bus, wherein the memory includes a set of computer usable program code; and a processor unit connected to the bus, wherein the processor unit executes the set of computer usable program code to:

receive a description of at least one change to the event processing system;

identify each path from each at least one producer to each at least one consumer;

responsive to identifying each path, identify, at each node along each path, a plurality of next-hop neighbor nodes;

assign a routing value to each of the identified plurality of next-hop neighbor nodes for each at least one consumer to form routing values, wherein assigning the routing value to each of the identified plurality of next-hop neighbor nodes for each at least one consumer comprises:

sending a plurality of routing probes from a producer of the at least one producer, the plurality of routing probes each traveling to a consumer of the at least one consumer via different paths based on a current routing value at each node in the event processing system; and for each of the plurality of routing probes, returning to the producer of the at least one producer along the same path traveled to the consumer to provide updated routing values to each node during the returning from the consumer to the producer;

estimate, using the routing values in a context of the at least one change to the event processing system, a performance cost of the event processing system based on at least one hypothetical changed placement of the computational components of the flow graph at nodes along at least one of the paths; and responsive to the estimating, select a changed placement of the computational components of the flow graph that minimizes the performance cost of the event processing system relative to the at least one hypothetical changed placement.

16. The dynamic component placement system of claim 15, wherein an entry of a routing table at each node indicates a probability of choosing a particular next-hop neighbor node to forward data to the consumer from the node.

17. The dynamic component placement system of claim 15, wherein the processor unit further executes the set of computer usable program code to:

estimate how performance would be affected by the at least one hypothetical changed placement to form estimated results;

report the estimated results to the producer of the at least one producer; and select the changed placement based on the estimated results.

* * * * *